United States Patent
Ohbayashi et al.

(10) Patent No.: US 12,247,149 B2
(45) Date of Patent: Mar. 11, 2025

(54) ELECTRICALLY CONDUCTIVE PASTE FOR ELECTROLYTIC CAPACITOR, AND ELECTROLYTIC CAPACITOR

(71) Applicant: Panasonic Intellectual Property Management Co., Ltd., Osaka (JP)

(72) Inventors: Takashi Ohbayashi, Osaka Fu (JP); Yoshihisa Nagasaki, Osaka Fu (JP); Yuji Miyachi, Saga Ken (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 345 days.

(21) Appl. No.: 17/800,848

(22) PCT Filed: Feb. 10, 2021

(86) PCT No.: PCT/JP2021/004992
§ 371 (c)(1),
(2) Date: Aug. 18, 2022

(87) PCT Pub. No.: WO2021/166765
PCT Pub. Date: Aug. 26, 2021

(65) Prior Publication Data
US 2023/0105450 A1  Apr. 6, 2023

(30) Foreign Application Priority Data
Feb. 20, 2020 (JP) ................................ 2020-027575

(51) Int. Cl.
*C09J 9/02* (2006.01)
*C08G 59/24* (2006.01)
(Continued)

(52) U.S. Cl.
CPC .............. *C09J 9/02* (2013.01); *C08G 59/245* (2013.01); *C08G 59/5073* (2013.01); *C08K 7/08* (2013.01);
(Continued)

(58) Field of Classification Search
CPC ..... C08K 2201/001; C09J 163/00; C09J 9/02; C08G 59/5073; C08G 59/245; H01G 9/008; H01G 9/15
See application file for complete search history.

(56) References Cited

U.S. PATENT DOCUMENTS 4,752,536 A * 6/1988 Shimizu ................ C04B 41/009
428/605
2009/0009930 A1 1/2009 Furuzawa et al.
(Continued)

FOREIGN PATENT DOCUMENTS

CN 102676102 A * 9/2012
CN 104221106 A 12/2014
(Continued)

OTHER PUBLICATIONS

International Search Report issued in corresponding International Patent Application No. PCT/JP2021/004992, dated Apr. 27, 2021, with English translation.
(Continued)

*Primary Examiner* — David M Sinclair
(74) *Attorney, Agent, or Firm* — Rimon P.C.

(57) ABSTRACT

A conductive paste for an electrolytic capacitor used for connecting a cathode part and a cathode lead terminal of the electrolytic capacitor. The conductive paste includes a thermosetting resin, and conductive particles, and the conductive particles include flaky metal particles and acicular conductive particles. The content of the conductive particles in the conductive paste is, for example, 50 mass % or more
(Continued)

and 70 mass % or less, and the mass ratio of the flaky metal particles to the total of the flaky metal particles and the acicular conductive particles is, for example, 60% or more and 80% or less.

21 Claims, 1 Drawing Sheet

(51) Int. Cl.
*C08G 59/50* (2006.01)
*C08K 7/08* (2006.01)
*C09J 163/00* (2006.01)
*H01G 9/10* (2006.01)
*H01G 9/15* (2006.01)
*H01G 9/052* (2006.01)

(52) U.S. Cl.
CPC .............. *C09J 163/00* (2013.01); *H01G 9/10* (2013.01); *C08K 2201/001* (2013.01); *C08K 2201/003* (2013.01); *C08K 2201/004* (2013.01); *C08K 2201/014* (2013.01); *C08K 2201/016* (2013.01); *H01G 9/052* (2013.01); *H01G 9/15* (2013.01)

(56) References Cited

U.S. PATENT DOCUMENTS

| | | |
|---|---|---|
| 2015/0009606 A1 | 1/2015 | Mishima et al. |
| 2015/0212127 A1 | 7/2015 | Ikeda et al. |
| 2015/0228412 A1 * | 8/2015 | Choi ................... H01G 9/048 361/529 |

FOREIGN PATENT DOCUMENTS

| | | | |
|---|---|---|---|
| JP | H07-205395 A | | 8/1995 |
| JP | 2006-032412 A | | 2/2006 |
| JP | 2006-049106 A | | 2/2006 |
| JP | 2010-187016 A | | 8/2010 |
| JP | 2014033133 A | * | 2/2014 |
| JP | 2016-089038 A | | 5/2016 |
| JP | 2016-121241 A | | 7/2016 |
| WO | 2014/103569 A1 | | 7/2014 |
| WO | 2017/217509 A1 | | 12/2017 |
| WO | WO-2020003765 A1 * | 1/2020 | ............... C08K 3/08 |

OTHER PUBLICATIONS

Office Action with partial English translation dated Jun. 14, 2024, issued in corresponding Chinese Application No. 202180014011.3, 11 pages.

* cited by examiner

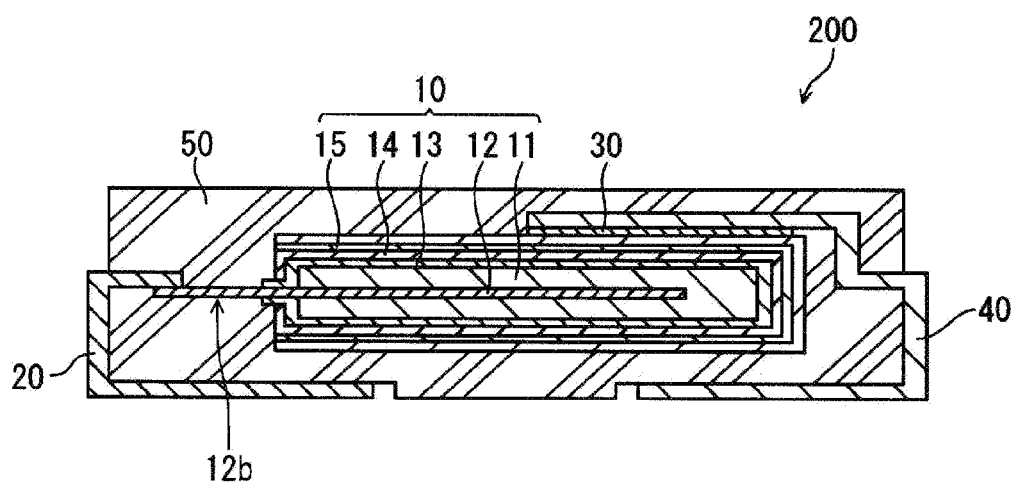

ELECTRICALLY CONDUCTIVE PASTE FOR ELECTROLYTIC CAPACITOR, AND ELECTROLYTIC CAPACITOR

CROSS-REFERENCE TO RELATED APPLICATIONS

This application is the U.S. National Phase under 35 U.S.C. § 371 of International Patent Application No. PCT/JP2021/004992, filed on Feb. 10, 2021, which in turn claims the benefit of Japanese Patent Application No. 2020-027575, filed on Feb. 20, 2020, the entire content of each of which is incorporated herein by reference.

TECHNICAL FIELD

The present invention relates to a conductive paste for an electrolytic capacitor and an electrolytic capacitor.

BACKGROUND ART

Electrolytic capacitors have low equivalent series resistance (ESR) and excellent frequency characteristics, and are mounted in various electronic devices. An electrolytic capacitor typically includes a capacitor element including an anode part and a cathode part, an anode lead terminal electrically connected to the anode part, and a cathode lead terminal electrically connected to the cathode part. The capacitor element is typically sealed by a package member.

Patent Literature 1, with an aim to provide a solid electrolytic capacitor having a low ESR and excellent element-to-terminal connection strength, discloses a solid electrolytic capacitor including a capacitor element in which a dielectric film and a cathode layer are sequentially formed on the surface of an anode body, and a plate-like terminal attached on the capacitor element via a conductive adhesive layer, wherein the conductive adhesive layer includes flat conductive members, and the conductive adhesive layer has a region where the flat conductive members are laid along the plate-like terminal and a region where the flat conductive members are standing in the thickness direction of the conductive adhesive layer.

CITATION LIST

Patent Literature

[PTL 1] Japanese Laid-Open Patent Publication No. 2010-187016

SUMMARY OF INVENTION

Technical Problem

However, only containing flat conductive members in the conductive adhesive as in Patent Literature 1 is not sufficient to improve the element-to-terminal connection strength. Moreover, since the conductive adhesive of Patent Literature 1 contains an organic solvent composed of a dibasic acid ester, voids are likely to occur between the element and the terminal.

Solution to Problem

One aspect of the present invention relates to a conductive paste for an electrolytic capacitor used for connecting a cathode part and a cathode lead terminal of the electrolytic capacitor, the conductive paste including: a thermosetting resin; and conductive particles, wherein the conductive particles include flaky metal particles and acicular conductive particles.

Another aspect of the present invention relates to an electrolytic capacitor, including: a capacitor element including an anode part and a cathode part; an anode lead terminal electrically connected to the anode part; a cathode lead terminal electrically connected to the cathode part; and a joint portion interposed between the cathode part and the cathode lead terminal, wherein the joint portion includes a resin cured product, and conductive particles embedded in the resin cured product, and the conductive particles include flaky metal particles and acicular conductive particles.

Advantageous Effects of Invention

According to the present invention, it is possible to increase the strength of the joint portion between the cathode part and the cathode lead terminal of the electrolytic capacitor and achieve favorable ESR.

While the novel features of the invention are set forth particularly in the appended claims, the invention, both as to organization and content, will be better understood and appreciated, along with other objects and features thereof, from the following detailed description taken in conjunction with the drawings.

BRIEF DESCRIPTION OF DRAWING

FIG. 1 A schematic cross-sectional view illustrating a configuration of an electrolytic capacitor according to one embodiment of the present invention.

DESCRIPTION OF EMBODIMENTS

A conductive paste for an electrolytic capacitor according to the present embodiment (hereinafter sometimes simply referred to as a conductive paste) is used for connecting a cathode part and a cathode lead terminal. The electrolytic capacitor includes a capacitor element including an anode part and a cathode part, an anode lead terminal electrically connected to the anode part, a cathode lead terminal electrically connected to the cathode part, and a joint portion interposed between the cathode part and the cathode lead terminal. The cathode part of the capacitor element can contain a conductive polymer. The conductive paste is used for forming the joint portion.

The conductive paste includes a thermosetting resin, and electrically conductive particles. The conductive particles includes flaky metal particles and acicular conductive particles. The thermosetting resin encompasses all materials (mainly organic substances) that react by heating. That is, the thermosetting resin is a concept including a curing agent, a reactive diluent, and the like.

By using flaky metal particles and acicular conductive particles in combination as the conductive particles, the joint portion formed between the cathode part and the cathode lead terminal can have low resistance and excellent mechanical strength. This is presumably because the contact ratio between the conductive particles is increased to improve the electrical conductivity, and the strength of the joint portion is improved by the presence of the acicular conductive particles. As a result, the joint portion that enables to achieve high strength and low ESR can be formed between the cathode part and the cathode lead terminal of the electrolytic capacitor. Furthermore, the conductive paste is cured into a film while the flaky metal particles are stacked one after another in layers, and the oxygen diffusion path becomes longer, reducing the influence by oxidation on the cathode part (esp., on the conductive polymer). This can reduce the deterioration in the characteristics of the conductive polymer due to the heat at the time of forming a joint portion.

When the decrease in the resistance of the joint portion is remarkable, the conductive particles can be used in less amount. That is, the amount of the conductive particles used can be reduced, and the ratio of the thermosetting resin occupying the conductive paste can be increased, which can further improve the mechanical strength of the joint portion. Furthermore, by reducing the amount of the conductive particles used, the manufacturing costs of the conductive paste can be reduced.

The content of the conductive particles in the conductive paste may be, for example, 50 mass % or more and 70 mass % or less, and may be 55 mass % or more and 66 mass % or less. Here, the conductive particles may contain flaky metal particles and acicular conductive particles in a ratio of 80 mass % or more of the whole conductive particles, or in in a ratio of 90 mass % or more, and substantially all the conductive particles (e.g., 99 mass % or more) may be composed of flaky metal particles and acicular conductive particles.

The mass ratio of the flaky metal particles to the total of the flaky metal particles and the acicular conductive particles is, for example, 60% or more and 80% or less (i.e., the mass ratio of the acicular conductive particles is 20% or more and 40% or less). Using the flaky metal particles and the acicular conductive particles in combination in such a ratio can effectively increase the contacts between the conductive particles, and thus, can remarkably improve the conductivity of the joint portion. More preferably, the mass ratio of the flaky metal particles to the total of the flaky metal particles and the acicular conductive particles may be set to 65% or more and 75% or less (i.e., the mass ratio of the acicular conductive particles is 25% or more and 35% or less).

Specifically, in order to effectively reduce the ESR of the electrolytic capacitor and improve the application workability of the conductive paste, the content of the flaky metal particles in the conductive paste may be set to 35 mass % or more and 45 mass % or less, and may be set to 38 mass % or more and 43 mass % or less. From the similar point of view, the content of the acicular conductive particles in the conductive paste may be set to 12 mass % or more and 22 mass % or less, and may be set to 15 mass % or more and 20 mass % or less. When the flaky metal particles and the acicular conductive particles are contained in the above range, the resistance of the joint portion can be remarkably decreased, and the application workability of the conductive paste can be further improved. At this time, the content of the thermosetting resin in the conductive paste may be set to 33 mass % or more and 45 mass % or less, and may be set to 36 mass % or more and 43 mass % or less. By setting as above, the joint portion with higher strength can be easily formed.

The flaky metal particles are constituted of flaky thin pieces. When the thickness (minimum width) of the flaky metal particles is denoted by T, the maximum diameter (major axis diameter) L of the flaky metal particles viewed from a direction parallel to the direction of the thickness T, and the maximum diameter (minor axis diameter) W orthogonal to the maximum diameter satisfy $L \geq W$, and T is sufficiently smaller than W.

The aspect ratio: L/T of the maximum diameter L to the thickness T of the flaky metal particles is, for example, 20 or more on average, and preferably satisfies $30 \leq L/T$. Likewise, the aspect ratio: W/T of the minor axis diameter W to the thickness T of the flaky metal particles is 20 or more on average, and preferably satisfies $30 \leq W/T$. The average maximum diameter may be 1 μm or more and 30 μm or less, and may be 2 μm or more and 10 μm or less.

The thickness T, the major axis diameter L, and the minor axis diameter W of the flaky metal particles can be measured by separating the conductive particles from the conductive paste, separating the flaky metal particles and the acicular conductive particles from the conductive particles by centrifugation or other techniques, and photographing randomly selected 10 or more flaky metal particles with an electron microscope, to perform image analysis. For example, the major axis diameter L of each of the 10 or more flaky metal particles photographed is measured, and with the numerical values within 20% from the maximum value and 20% from the minimum value in the distribution excluded, the numerical values within the remaining middle portion 60% (e.g., when 10 particles are photographed, the values of 6 particles) are averaged, to determine the major axis diameter L. Next, the thickness of the particles within the middle portion 60% is measured, and the average of the measured values can be determined as the thickness T. With respect to the particles within the middle portion 60%, the aspect ratios of each particle are measured, and the averages of the measured values can be determined as the aspect ratios: L/T and W/T, respectively.

The specific surface area of the flaky metal particles may be, for example, 1 $m^2/g$ or more and 5 $m^2/g$ or less, and may be 1.5 $m^2/g$ or more and 3 $m^2/g$ or less. The specific surface area can be determined by measuring the specific surface area of the flaky metal particles separated similarly to the above, by the BET method.

The bulk density of the flaky metal particles is, for example, 0.3 $g/cm^3$ or more and 1 $g/cm^3$ or less, and may be 0.4 $g/cm^3$ or 0.9 $g/cm^3$ or less. The bulk density can be measured under the conditions in accordance with JIS Z 2504.

The metal constituting the flaky metal particles is not limited, but is preferably gold, silver, or the like. In particular, silver is preferred because it is excellent in electrical conductivity and corrosion resistance, and advantageous in cost. Silver may be the main component of the flaky metal particles. The main component means a component that occupies 50 mass % or more of the flaky metal particles. Silver may occupy 80 mass % or more of the flaky metal particles, and may occupy 99 mass % or more.

The acicular conductive particles are constituted of whisker-like linear pieces. When the fiber length of the acicular conductive particles is denoted by FL, the thickness in the direction perpendicular to the length direction at the center in the length direction is the fiber diameter D, and D is sufficiently smaller than FL.

The aspect ratio: FL/D of the fiber length FL to the fiber diameter D of the acicular conductive particles is, for example, 10 or more on average, and preferably satisfies $20 \leq FL/D$. The average fiber diameter is, for example, 0.1 μm or more and 2 μm or less, and may be 0.3 μm or more and 1 μm or less. The average fiber length is, for example, 5 μm or more and 30 μm or less, and may be 8 μm or more and 20 μm or less.

The fiber diameter D, the fiber length FL, and the aspect ratio: FL/D can be measured by photographing 10 or more acicular conductive particles randomly selected from those separated similarly to the above, with an electron microscope, to perform image analysis. For example, the fiber diameter of each of the 10 or more acicular conductive particles is measured, and with the numerical values within 20% from the maximum value and 20% from the minimum value in the distribution excluded, the numerical values within the remaining middle portion 60% (e.g., when 10 particles are photographed, the values of 6 particles) are averaged, to determine the fiber diameter D. Next, the fiber length of the particles within the middle portion 60% is measured, and the average of the measured values can be determined as the fiber length FL. With respect to the particles within the middle portion 60%, the aspect ratio of each particle is measured, and the average of the measured values can be determined as the aspect ratio: FL/D.

The specific surface area of the acicular conductive particles may be, for example, 0.5 $m^2/g$ or more and 1.5 $m^2/g$ or less, and may be 0.8 $m^2/g$ or more and 1.2 $m^2/g$ or less. The specific surface area can be determined by measuring the specific surface area of the acicular conductive particles separated similarly to the above, by the BET method.

The bulk density of the acicular conductive particles is, for example, 0.5 $g/cm^3$ or less, and may be 0.3 $g/cm^3$ or less. The bulk density can be measured under the conditions in accordance with JIS Z 2504.

The acicular conductive particles may have acicular ceramic particles and a metal film covering at least part of a surface of the ceramic particles. As the acicular ceramic particles, acicular crystals (whiskers) of various ceramics can be used. By using the acicular ceramic particles as the core, the strength of the acicular conductive particles themselves can be remarkably increased. Therefore, the mechanical strength of the joint portion is likely to be improved, and in particular, the resistance against peeling can be remarkably improved.

When the content of the ceramic component (core of the ceramic particles) in the acicular conductive particles is, for example, 20 mass % or more, the mechanical strength can be sufficiently increased. On the other hand, in view of maintaining high electrical conductivity of the acicular conductive particles, the content of the ceramic component contained in the acicular conductive particles may be set to, for example, 40 mass % or less (the content of the metal film is 60 mass % or more).

The metal constituting the metal film is not limited, but is preferably gold, silver or the like. In particular, silver is preferred because it is excellent in electrical conductivity and corrosion resistance, and advantageous in cost. Silver may be the main component of the metal film. The main component means a component that occupies 50 mass % or more of the metal film. Silver may occupy 80 mass % or more of the metal film, and may occupy 99 mass % or more.

For the acicular ceramic particles, for example, potassium titanate, graphite, aluminum oxide, silicon carbide, silicon nitride, magnesium sulfate, magnesium borate, zinc oxide, titanium boride, and the like can be used. These may be used singly or in combination of two or more kinds. Among them, potassium titanate is particularly preferred in terms of strength.

The conductive paste may be of solvent-free type that does not contain a solvent. In other words, the content of the solvent that can be contained in the conductive paste may be 0.1 mass % or less. The solvent refers to a component that is not involved in the reaction and volatilizes during curing of the conductive paste.

With a common solvent-free type conductive paste, in order to achieve favorable ESR, it is necessary to contain conductive particles therein in an amount of as high as about 85 mass %. In this case, the application workability of the conductive paste is reduced, and the strength of the joint portion tends to be insufficient. On the other hand, when a solvent is contained in the conductive paste, the application workability is improved, but voids derived from the solvent are formed in the joint portion. Since the conductive paste is cured by heating while being sandwiched between the cathode part and the cathode lead terminal, the solvent is likely to remain, to form voids. The presence of voids can cause a reduction in the strength of the joint portion.

The thermosetting resin contains, for example, an epoxy resin and a reactive diluent. By containing a reactive diluent, the conductive paste having more excellent application workability can be obtained. The viscosity of the reactive diluent at 25° C. is preferably, for example, 60 Pas or less, and may be 20 Pa·s or less. The reactive diluent with such a low viscosity can function similarly to the solvent, and can significantly improve the application workability of the conductive paste. Here, the viscosity refers to a viscosity measured using a rotary rheometer under the condition of the shear rate of 2.5 $s^{-1}$.

In view of improving the productivity of the electrolytic capacitor, a shorter curing time of the thermosetting resin has been desired. For reducing the curing time, it is effective to reduce the viscosity of the conductive paste at the time of melting. However, in order to cure the thermosetting resin in a short time, the heating temperature should be increased. For example, when a conductive paste containing a solvent is cured at a high temperature and in a short time, the solvent volatilizes rapidly and becomes difficult to escape from between the cathode part and the cathode lead terminal, and the voids tend to increase. On the other hand, in the case of a reactive diluent, which functions similarly to the solvent and reacts as a thermosetting resin to form part of the joint portion, the voids are unlikely to increase.

In consideration of the viscosity of the conductive paste, the reactive diluent preferably has an epoxy equivalent (EEW) of 50 to 400 g/eq, more preferably 100 to 350 g/eq. Furthermore, the reactive diluent is preferably a monofunctional or bifunctional epoxy compound.

Examples of the monofunctional epoxy compound include alkyl glycidyl ether or alkenyl glycidyl ether, which are alcohol ethers having 3 to 15 carbon atoms, and aromatic glycidyl ether having one phenoxy group. Examples of the bifunctional epoxy compound include alkylene glycol diglycidyl ether, and polyoxyalkylene didiglycidyl ether. Specific examples thereof include, n-butyl glycidyl ether, 2-ethylhexyl glycidyl ether, allyl glycidyl ether, higher alcohol glycidyl ether, phenyl glycidyl ether, cresyl glycidyl ether, sec-butylphenyl glycidyl ether, polyethylene glycol diglycidyl ether, polypropylene glycol diglycidyl ether, neopentyl glycol diglycidyl ether, and 1,6-hexanediol diglycidyl ether.

The thermosetting resin may contain a reactive diluent in an amount of, for example, 30 parts by mass or more and 50 parts by mass or less, and further 35 parts by mass or more and 45 parts by mass or less, per 100 parts by mass of the epoxy resin. This can form a joint portion excellent in application workability and more excellent in strength. Specifically, in the conductive paste, the content of the epoxy resin may be, for example, 25 mass % or more and 30 mass % or less, and the content of the reactive diluent may be, for example, 9 parts by mass or more and 15 parts by mass or less.

The epoxy resin is not limited, and includes, for example, bisphenol A-type epoxy resins, bisphenol F-type epoxy resins, bisphenol AD-type epoxy resins, bisphenol S-type epoxy resins, fluorene-type epoxy resins, naphthalene-type epoxy resins, biphenyl-type epoxy resins, glycidylamine-type epoxy resins, alicyclic epoxy resins, dicyclopentadiene-type epoxy resins, novolac-type epoxy resins, polyether-type epoxy resins, and silicone-modified epoxy resins. These may be used singly or in combination of two or more kinds. In particular, in view of obtaining a conductive paste having favorable application workability, bisphenol A-type epoxy resins and bisphenol F-type epoxy resins having a molecular weight of 320 or more and 400 or less, and the like are preferred, and bisphenol F-type epoxy resins, which show less steric hindrance and have low viscosity, are more preferred. Examples of the bisphenol A-type epoxy resins include JER (registered trademark) 825, JER (registered trademark) 827, and JER (registered trademark) 828, all available from Mitsubishi Chemical Corporation. Examples of the bisphenol F-type epoxy resins include JER (registered trademark) 806 and JER (registered trademark) 807, all available from Mitsubishi Chemical Corporation.

The thermosetting resin contains a curing agent. Examples of the curing agent include phenolic resins, acid anhydrides, amine compounds, imidazole compounds, phosphorus compounds, phosphonium salt compounds, bicyclic amidines, organic metal complexes, polyamine urea products, dicyandiamides, amine adduct-type aliphatic tertiary amines, and microcapsule-type curing agents. These may be used singly or in combination of two or more kinds. In particular, imidazole compounds are preferred, and an imidazole compound (hereinafter sometimes referred to as an "imidazole compound PH") having at least one hydroxyl group (OH group), and a phenyl group directly bonded to the imidazole structure is preferred. The imidazole compound PH allows for curing of the thermosetting resin at a high temperature and in a short time. As a result, the productivity of the electrolytic capacitor can be significantly improved, and in addition, the ESR of the electrolytic capacitor can be more efficiently reduced. By curing the thermosetting resin containing a reactive diluent at a high temperature and in a short time, the joint portion can be shrunk by heat to a greater degree, and the contacts between the conductive particles are more likely to increase.

The imidazole compound PH is contained in the thermosetting resin in a ratio of, for example, 3 parts by mass or more and 10 parts by mass or less per 100 parts by mass of the total of the epoxy resin and the reactive diluent. In the joint portion formed after the curing of the thermosetting resin, the content of the structure derived from the imidazole compound PH is, for example, about 2 to 6 mass %.

Examples of the imidazole compound PH include 2-phenyl-4-methyl hydroxymethylimidazole, and 2-phenyl-4,5-dihydroxymethylimidazole. In particular, 2-phenyl-4,5-dihydroxymethylimidazole is effective in reducing the ESR of the electrolytic capacitor and can improve the long-term connection reliability of the joint portion. The OH group of the imidazole compound PH presumably serves to prevent the oxidation of the conductive particles, so that the resistance of the joint portion is kept low.

A common additive may be contained in the conductive paste. For example, in order to improve the adhesion between the epoxy resin and the conductive particles, a silane coupling agent may be contained in the conductive paste, and in order to obtain the dispersibility of the conductive particles, an anionic, cationic or non-ionic dispersant may be added.

The curing time of the thermosetting resin (i.e., the conductive paste) is preferably short in view of improving the productivity of the electrolytic capacitor, which is, for example, 5 minutes or less, and further, 2 minutes or less (preferably about 1 minute). The imidazole compound PH allows for curing in such a short time. In order to achieve the curing in a shorter time, the curing temperature may be set, for example, to 180° C. or higher and 250° C. or lower, or to 200° C. or higher and 230° C. or lower.

Next, an electrolytic capacitor according to the present embodiment includes a capacitor element including an anode part and a cathode part, an anode lead terminal electrically connected to the anode part, a cathode lead terminal electrically connected to the cathode part, and a joint portion interposed between the cathode part and the cathode lead terminal. The joint portion includes a resin cured product, and conductive particles embedded in the resin cured product. The conductive particles include flaky metal particles and acicular conductive particles. Such an electrolytic capacitor can be obtained by forming the joint portion using the conductive paste according to the present embodiment.

The joint portion has a void ratio of, for example, 5 vol % or less, preferably 3 vol % or less. With a conductive paste whose viscosity or application workability is controlled by a reactive diluent, even when the conductive paste is cured at a high temperature and in a short time, since there are almost no components that volatilize by heat, voids are less likely to be formed in the joint portion. Reduced voids can result in a joint portion having more excellent mechanical strength.

The void ratio of the joint portion can be determined by taking a cross-sectional image of the joint portion of the electrolytic capacitor (region R between the cathode part and the cathode lead terminal), and performing image processing, such as binarization, to calculate a ratio of an area occupied by the voids to an area of the region R. Here, desirably, the void ratio is determined for the region R of at least 100,000 $\mu m^2$ in size.

The structure of the joint portion reflects the composition of the conductive paste. For example, the content of the conductive particles in the joint portion is 50 mass % or more and 70 mass % or less. The content of the conductive particles in the joint portion can be measured by disassembling the electrolytic capacitor, separating the joint portion to prepare a sample of the joint portion, and subjecting the sample to thermal analysis. Specifically, by measuring the mass of the sample reduced by the combustion of the resin cured product, using a differential scanning calorimeter, the content of the conductive particles can be determined.

Furthermore, in the joint portion, the mass ratio of the flaky metal particles to the total of the flaky metal particles and the acicular conductive particles is 60% or more and 80% or less. The mass ratio can be measured by separating the residue (conductive particles) remaining after the combustion of the resin cured product, by centrifugation or other techniques.

Specifically, in a joint portion of a preferred embodiment, the content of the flaky metal particles is 35 mass % or more and 45 mass % or less, the content of the acicular conductive particles is 12 mass % or more and 22 mass % or less, and the content of the resin cured product is 33 mass % or more and 45 mass % or less.

The shapes etc. of the flaky metal particles and the acicular conductive particles contained in the joint portion can be measured by taking a cross-sectional image of the joint portion of the electrolytic capacitor (region R between the cathode part and the cathode lead terminal), and performing image processing. In the cross-sectional image, the flaky metal particles and the acicular conductive particles are visually distinguishable.

The flaky metal particles, in a cross section in the thickness direction of the joint portion, are oriented in a direction perpendicular to the above thickness direction. Therefore, it is possible to measure the thickness of the flaky metal particles and the particle length X in the direction perpendicular to the above thickness. Here, the particle length X may be regarded as the major axis diameter L. With respect to any 10 or more flaky metal particles included in the cross-sectional image, the particle length X is measured, and with the numerical values within 20% from the maximum value and 20% from the minimum value in the distribution excluded, the numerical values within the remaining middle portion 60% (e.g., when 10 particles are photographed, the values of 6 particles) are averaged. Next, the thickness of the particles within the middle portion 60% is measured, and the average of the measured values can be determined as the thickness T. With respect to the particles within the middle portion 60%, the aspect ratio of each particle is measured, and the average of the measured values can be determined as the aspect ratio: L(X)/T.

The acicular conductive particles are randomly oriented, as compared to the flaky metal particles. From the acicular conductive particles included in the cross-sectional image, any 10 or more acicular conductive particles whose overall length is measurable are selected, to measure the fiber length of each particle, and with the numerical values within 20% from the maximum value and 20% from the minimum value in the distribution excluded, the numerical values within the remaining middle portion 60% (e.g., when 10 particles are photographed, the values of 6 particles) are averaged, to determine the fiber length FL. Next, the fiber diameter of the particles within the middle portion 60% is measured, and the average of the measured values can be determined as the fiber diameter D. With respect to the particles within the middle portion 60%, the aspect ratio of each particle is measured, and the average of the measured values can be determined as the aspect ratio: FL/D.

The electrolytic capacitor may have a package member sealing the capacitor element and allowing each of the anode lead terminal and the cathode lead terminal to be partially exposed. The package member serves to protect the capacitor element from external heat and moisture and reinforce the mechanical strength of the joint portion. The package member is composed of, for example, a cured product of an electrically insulating thermosetting resin composition. The thermosetting resin composition contains, for example, an epoxy resin or the like as a main component, and may contain an insulating filler, such as inorganic particles.

FIG. 1 is a schematic vertical cross-sectional view of an electrolytic capacitor according to the present embodiment. An electrolytic capacitor 200 has a substantially hexahedron outer shape including three pairs of opposite planes, and has a capacitor element 10, a package member 50 sealing the capacitor element 10, and an anode lead terminal 20 and a cathode lead terminal 40 exposed to the outside of the package member 50.

The capacitor element 10 has: a porous sintered body 11, which is an anode body, with part of an anode wire 12 embedded therein; a dielectric layer 13 formed on the surface of the anode body; a solid electrolyte layer 14 formed on the surface of the dielectric layer 13; and a cathode layer 15 formed on the surface of the solid electrolyte layer 14. The solid electrolyte layer 14 can contain a conductive polymer. The anode wire 12 and the porous sintered body 11 constitute the anode part. The solid electrolyte layer 14 and the cathode layer 15 constitute a cathode part.

An exposed portion 12b of the anode wire 12 protruding from the porous sintered body 11 is electrically connected to the anode lead terminal 20 by resistance welding or the like. On the other hand, the cathode layer 15 of the cathode part is electrically connected to the cathode lead terminal 40 via a conductive paste 30 within the package member 50. The anode lead terminal 20 and the cathode lead terminal 40 shown in FIG. 1 protrude from the package member 50, and are bent so that the lower surfaces thereof flush with the bottom surface of the package member 50. The lower surfaces of the anode lead terminal 20 and the cathode lead terminal 40 are used for, for example, solder connection with a substrate (not shown) on which the electrolytic capacitor 200 is to be mounted.

The porous sintered body 11 is, for example, a rectangular parallelepiped molded product obtained by sintering metal particles. The metal particles may be of a valve metal, such as titanium (Ti), tantalum (Ta), and niobium (Nb).

The anode wire 12 is constituted of a conductive material. The material of the anode wire 12 is not limited, and examples thereof include, in addition to the above-exemplified valve metals, copper, aluminum, and aluminum alloys.

The dielectric layer 13 is constituted of, for example, a metal oxide. A method of forming a layer containing a metal oxide on the surface of the porous sintered body 11 includes, for example, a method of immersing the porous sintered body 11 in a chemical conversion solution, to anodize the surface of the porous sintered body 11, and a method of heating the porous sintered body 11 in an atmosphere containing oxygen.

The solid electrolyte layer 14 is formed so as to cover at least part of the dielectric layer 13. For the solid electrolyte layer 14, for example, a manganese compound or a conductive polymer is used. Examples of the conductive polymer include polypyrrole, polythiophene, polyfuran, polyaniline, polyacetylene, polyphenylene, polyparaphenylene vinylene, polyacene, polythiophene vinylene, polyfluorene, polyvinylcarbazole, polyvinylphenol, polypyridine, and derivatives of these polymers. These may be used singly or in combination of two or more kinds. The conductive polymer may be a copolymer of two or more kinds of monomers. Among them, polythiophene, polyaniline, polypyrrole and the like are preferred because of their excellent conductivity. In particular, polypyrrole is preferred because of its excellent water repellency.

The cathode layer 15 has, for example, a carbon layer formed so as to cover the solid electrolyte layer 14, and a metal paste layer formed on the surface of the carbon layer. The carbon layer contains a conductive carbon material, such as graphite, and a resin. The metal paste layer contains, for example, metal particles (e.g., silver), and a resin. The configuration of the cathode layer 15 is not limited thereto.

The anode lead terminal 20 is electrically connected to the anode part via the anode wire 12. The material of the anode lead terminal 20 may be any material that is electrochemically and chemically stable and has conductivity, and may be metallic or non-metallic. The shape thereof is, for example, long and flat.

The cathode lead terminal 40 is electrically connected to the cathode part via a joint portion 30, which is a cured conductive paste. The material of the cathode lead terminal 40 also may be any material that is electrochemically and chemically stable and has conductivity, and may be metallic or non-metallic. The shape thereof is not limited, and is, for example, long and flat.

The package member 50 is formed by molding a thermosetting resin composition in a mold by, for example, transfer molding, or compression molding. Examples of the thermosetting resin include epoxy resin, phenol resin, silicone resin, melamine resin, urea resin, alkyd resin, polyurethane, polyimide, and unsaturated polyester.

The present invention will be specifically described below with reference to Examples, but is not limited to the following Examples.

Details of the materials used to prepare a thermosetting resin are shown below.

<Epoxy Resin>
 (a) bisphenol F-type epoxy resin (EEW: 165 g/eq)
 (b) bisphenol A-type epoxy resin (EEW: 190 g/eq)

<Reactive Diluent>
 (a) 2-ethylhexyl glycidyl ether (EEW: 205 g/eq, viscosity (25° C.): 3 mPa·s)
 (b) 1,6-hexanediol diglycidyl ether (EEW: 117 g/eq, viscosity (25° C.): 10 mPa·s)

<Curing Agent>
 (a) 2-phenyl-4-methyl-5-hydroxymethylimidazole
 (b) 2,4-diamino-6-(2'-ethyl-4'-methylimidazolyl-(1'))-ethyl-s-triazine
 (c) dicyandiamide
 (d) amine adduct-type aliphatic tertiary amine Example 1

The following conductive particles were prepared.
(Flaky Metal Particles A)
 Silver flakes (Ag content: 100%) with thickness T=0.2 µm, maximum diameter L=5.5 µm, and aspect ratio: L/T=27.5.
(Acicular Conductive Particles B)
 Potassium titanate whiskers having a silver film at their surfaces (Ag content: 75 mass %) with fiber diameter D=0.7 µm, fiber length FL=8 µm, and aspect ratio: FL/D=11.4.
(Thermosetting Resin A)
 A thermosetting resin was prepared by mixing 100 parts by mass of bisphenol F-type epoxy resin (the epoxy resin (a)), 42 parts by mass of 2-ethylhexyl glycidyl ether (the reactive diluent (a)) serving as a reactive diluent, and 10 parts by mass of 2-phenyl-4-methyl-5-hydroxymethylimidazole serving as a curing agent (the curing agent (a)).
(Conductive Paste A)
 Using the flaky metal particles A, the acicular conductive particles B, and the thermosetting resin A, a conductive paste A in which the content of the flaky metal particles A was 41 mass %, the content of the acicular conductive particles B was 17 mass %, and the content the thermosetting resin A was 42 mass % was prepared.

Comparative Example 1

The following conductive particles were prepared.
(Flaky Metal Particles C)
 Silver flakes (Ag content: 100%) with thickness T=1 µm, maximum diameter L=6 µm, and aspect ratio: L/T=6.
(Thermosetting Resin X)
 A thermosetting resin X was prepared by mixing 100 parts by mass of bisphenol F-type epoxy resin (the epoxy resin (a)), 6 parts by mass of dicyandiamide (the curing agent (c)) serving as a curing agent, 2 parts by mass of 2-phenylimidazole serving as a curing catalyst, and 35 parts by mass of a diethylene glycol monoethyl ether serving as a solvent.
(Conductive Paste X)
 Using the flaky metal particles C and the thermosetting resin X, a conductive paste X in which the content of the flaky metal particles C was 90 mass %, and the content of the non-volatile components (i.e., the components other than the solvent) in the thermosetting resin X was 10 mass % was prepared.

Comparative Example 2

(Thermosetting Resin Y)
 A thermosetting resin Y was prepared by mixing 100 parts by mass of bisphenol F-type epoxy resin (the epoxy resin (a)), 6 parts by mass of dicyandiamide (the curing agent (c)) serving as a curing agent, and 2 parts by mass of 2-phenylimidazole serving as a curing catalyst.
(Conductive Paste Y)
 Using the thermosetting resin Y, and the flaky metal particles C as used in Comparative Example 1, a conductive paste Y in which the content of the flaky metal particles C was 85 mass %, and the content of the thermosetting resin Y was 15 mass % was prepared.

[Evaluation]
(1) ESR
 An electrolytic capacitor having a rated voltage of 16 V and a rated capacitance of 100 µF was produced in the following manner.
(Preparation of Anode Part)
 Metal particles of tantalum as a valve metal whose primary particles have an average particle diameter D50 of about 0.1 µm were formed into a predetermined shape, and then sintered. A porous sintered body (anode part) with a tantalum anode wire partially embedded therein was thus prepared.
(Formation of Dielectric Layer)
 The porous sintered body was immersed in a chemical conversion bath, to form a dielectric layer of tantalum oxide on the surface of the porous sintered body through anodization. The chemical conversion voltage was set to 60 V.
(Preparation of Polymer Dispersion)
 In ion-exchanged water, 3,4-ethylenedioxythiophene and polystyrene sulfonic acid (PSS, weight average molecular weight: 100,000) was dissolved, and to the resultant mixed solution, under stirring, iron(III) sulfate (oxidizing agent) was added, to allow the polymerization reaction to proceed. Then, the reaction solution was dialyzed to remove the unreacted monomers and the oxidizing agent, to obtain a polymer dispersion containing polyethylene dioxythiophene doped with about 5 mass % of PSS (PEDOT/PSS).
(Formation of Solid Electrolyte Layer)
 The anode part was immersed in the polymer dispersion for 5 minutes in a reduced pressure atmosphere (40 kPa), and then, the anode part was pulled up from the polymer dispersion. Then, the anode part impregnated with the polymer dispersion was dried, to form a solid electrolyte layer covering at least part of the dielectric layer.
(Formation of Cathode Part)
 A carbon layer was formed using carbon paste on the surface of the solid electrolyte layer, and a silver paste was applied onto the surface of the carbon layer, to form a silver paste layer. In this way, a capacitor element having a cathode part constituted of the carbon layer and the silver paste layer was obtained.

(Joining of Lead Terminals)

A lead frame which was an integrated form of an anode lead terminal and a cathode lead terminal was cut out from a single aluminum foil. Next, a predetermined conductive paste was applied onto a surface of the solid electrolyte layer, to which the cathode lead terminal of the lead frame was connected. On the other hand, the exposed portion of the anode wire was welded to the anode lead terminal of the lead frame. This was followed by heating at 210° C. for 1 minute, to cure the conductive paste, so that a joint portion was formed between the cathode part and the cathode lead terminal.

(Sealing of Capacitor Element)

The lead frame and the capacitor element were sealed with a package member, to complete an electrolytic capacitor as shown in FIG. 1. This was followed by aging performed at 95° C. for 90 minutes under application of the rated voltage. The ESR of the electrolytic capacitor after aging was measured. When the ESR was equal to or lower than the standard value, it was rated as "Good", when higher than the standard value by less than 0.5 milliohms, it was rated as "Acceptable", and when higher than the standard value by 0.5 milliohms or more, it was rated as "Bad."

(2) Bonding Strength

Two long pieces of aluminum sheet for tensile testing were bonded together with a conductive paste, and heated at 210° C. for 1 minute to cure the conductive paste, and then, the tensile strength was measured using a tensile compression tester available from Imada Seisakusho Co., Ltd. When the tensile strength was equal to or higher than the standard value, it was rated as "Good", when lower than the standard value by less than 2N, it was rated as "Acceptable", and when lower than the standard value by 2N or more, it was rated as "Bad."

(3) Void Ratio

By the already-described method, the cross section of the joint portion of the electrolytic capacitor was photographed with an electronic microscope, and image processing was performed to calculate the void ratio. When the void ratio was 5 vol % or less, it was rated as "Good", and when the void ratio exceeded 5 vol %, it was rated as "Bad."

(4) Application Workability

In applying the conductive paste with the dispenser, when it was able to be applied flat without bumps, it was rated as "Good", and when stringiness or bumps occurred, it was rated as "Bad."

TABLE 1

| Conductive paste | A | X | Y |
|---|---|---|---|
| Conductive particles | | | |
| A | 41 wt % | — | — |
| B | 17 wt % | — | — |
| C | — | 90 wt % | 85 wt % |
| Thermosetting resin | | | |
| A | 42 wt % | — | — |
| X | — | 10 wt % | — |
| Y | — | — | 15 wt % |
| Solvent | Without | With | Without |
| Evaluation | | | |
| ESR | Good | Good | Good |
| Bonding strength | Good | Acceptable | Bad |
| Void ratio | Good | Bad | Good |
| Application workability | Good | Good | Bad |

Table 1 shows that when using the conductive paste A including the flaky metal particles A and the acicular conductive particles B in combination, a high bonding strength can be obtained, as compared to when using the conventional solvent-type or solvent free-type conductive paste. Furthermore, the conductive paste A is excellent in application workability, and when using it, the void ratio of the joint portion can be reduced.

Examples 2 to 5

Conductive pastes B to E of Examples 2 to 5 were prepared in the same manner as in Example 1, except that the contents of the flaky metal particles A, the acicular conductive particles B, and the thermosetting resin A were changed as shown in Table 2.

TABLE 2

| | Conductive paste | | | | |
|---|---|---|---|---|---|
| | A | B | C | D | E |
| Conductive particles | | | | | |
| A | 41 wt % | 32 wt % | 41 wt % | 48 wt % | 41 wt % |
| B | 17 wt % | 17 wt % | 10 wt % | 10 wt % | 25 wt % |
| Thermosetting resin | | | | | |
| A | | 51 wt % | 49 wt % | 42 wt % | 34 wt % |
| Evaluation | | | | | |
| Bonding strength | Good | Good | Good | Good | Good |
| Void ratio | Good | Good | Good | Good | Good |
| Application workability | Good | Good | Good | Acceptable | Acceptable |

Table 2 shows that when the conductive particles have a predetermined composition, more favorable application workability can be achieved, and a joint portion having well-balanced physical properties can be formed.

Examples 6 to 8

Conductive pastes F to H of Examples 6 to 8 were prepared in the same manner as in Example 1, except that the composition of the thermosetting resin was changed as shown in Table 3.

Example 6

(Thermosetting Resin F)

A thermosetting resin F was prepared by mixing 100 parts by mass of bisphenol F-type epoxy resin (the epoxy resin (a)), 42 parts by mass of 2-ethylhexyl glycidyl ether (the reactive diluent (a)) serving as a reactive diluent, and 10 parts by mass of 2,4-diamino-6-(2'-ethyl-4'-methylimidazolyl-(1'))-ethyl-s-triazine (the curing agent (b)) serving as a curing agent.

Example 7

(Thermosetting Resin G)

A thermosetting resin G was prepared by mixing 100 parts by mass of bisphenol A-type epoxy resin (the epoxy resin (b)), 42 parts by mass of 1,6-hexanediol diglycidyl ether (the reactive diluent (b)) serving as a reactive diluent, and 8 parts by mass of dicyandiamide (the curing agent (c)) serving as a curing agent, and 3 parts by mass of 2-phenylimidazole serving as a curing catalyst.

Example 8

(Thermosetting Resin H)

A thermosetting resin was prepared by mixing 100 parts by mass of bisphenol A-type epoxy resin (the epoxy resin (b)), 42 parts by mass of 1,6-hexanediol diglycidyl ether (the reactive diluent (b)) serving as a reactive diluent, and 29 parts by mass of an amine adduct-type tertiary amine (the curing agent (d)) serving as a curing agent.

TABLE 3

| Conductive paste | A | F | G | H |
|---|---|---|---|---|
| Epoxy resin | | | | |
| (a) | 100 | 100 | | |
| (b) | | | 100 | 100 |
| Reactive diluent | | | | |
| (a) | 42 | 42 | | |
| (b) | | | 42 | 42 |
| Curing agent | | | | |
| (a) | 10 | | | |
| (b) | | 10 | | |
| (c) | | | 8 | |
| (c) | | | | 29 |
| Evaluation | | | | |
| Bonding strength | Good | Good | Good | Good |
| Void ratio | Good | Good | Good | Good |
| Application workability | Good | Good | Good | Good |

Table 3 shows that even with different kinds of reactive diluents and/or curing agents, favorable application workability can be achieved, and a joint portion having well-balanced physical properties can be formed.

INDUSTRIAL APPLICABILITY

The present invention can be utilized for an electrolytic capacitor having an anode part including a porous sintered body, a metal foil, or the like, and is particularly useful in a solid electrolytic capacitor having a solid electrolyte layer on the surface of the dielectric layer formed on the anode part.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

REFERENCE SIGNS LIST

10: capacitor element
  12: anode wire
    12b: exposed portion
  13: dielectric layer
  14: solid electrolyte layer
  15: cathode layer
20: anode lead terminal
30: joint portion (cured conductive paste)
40: cathode lead terminal
50: package member
200: electrolytic capacitor

The invention claimed is:

1. A conductive paste for an electrolytic capacitor used for connecting a cathode part and a cathode lead terminal of the electrolytic capacitor, the conductive paste comprising:
no solvent or a solvent of 0.1 mass % or less;
a thermosetting resin; and
conductive particles, wherein
a content of the conductive particles in the conductive paste is 50 mass % or more and 70 mass % or less, and
the conductive particles include flaky metal particles and acicular conductive particles.

2. The conductive paste for an electrolytic capacitor according to claim 1, wherein a mass ratio of the flaky metal particles to a total of the flaky metal particles and the acicular conductive particles is 60% or more and 80% or less.

3. The conductive paste for an electrolytic capacitor according to claim 1, wherein
a content of the flaky metal particles is 35 mass % or more and 45 mass % or less,
a content of the acicular conductive particles is 12 mass % or more and 22 mass % or less, and
a content of the thermosetting resin is 33 mass % or more 45 mass % or less.

4. The conductive paste for an electrolytic capacitor according to claim 1, wherein
the flaky metal particles have
an aspect ratio of maximum diameter to thickness of 20 or more on average, and
an average maximum diameter of 1 μm or more and 30 μm or less.

5. The conductive paste for an electrolytic capacitor according to claim 1, wherein
the acicular conductive particles have
an aspect ratio of fiber length to fiber diameter of 10 or more on average,
an average fiber diameter of 0.1 μm or more and 2 μm or less, and
an average fiber length of 5 μm or more and 30 μm or less.

6. The conductive paste for an electrolytic capacitor according to claim 1, wherein the flaky metal particles contain silver as a main component.

7. The conductive paste for an electrolytic capacitor according to claim 1, wherein the acicular conductive particles have acicular ceramic particles and a metal film covering at least part of a surface of the ceramic particles.

8. The conductive paste for an electrolytic capacitor according to claim 7, wherein the metal film contains silver as a main component.

9. The conductive paste for an electrolytic capacitor according to claim 7, wherein the ceramic particles are of at least one kind selected from the group consisting of potassium titanate, graphite, aluminum oxide, silicon carbide, silicon nitride, magnesium sulfate, magnesium borate, zinc oxide, and titanium boride.

10. The conductive paste for an electrolytic capacitor according to claim 1, wherein the thermosetting resin contains an epoxy resin and a reactive diluent.

11. The conductive paste for an electrolytic capacitor according to claim 1, wherein the thermosetting resin includes an imidazole compound having at least one hydroxyl group, and a phenyl group directly bonded to an imidazole structure.

12. An electrolytic capacitor, comprising:
a capacitor element including an anode part and a cathode part;
an anode lead terminal electrically connected to the anode part;
a cathode lead terminal electrically connected to the cathode part; and
a joint portion interposed between the cathode part and the cathode lead terminal, wherein
the joint portion includes a conductive paste comprising no solvent or a solvent of 0.1 mass % or less, a resin cured product, and conductive particles embedded in the resin cured product,
the joint portion has a void ratio of 5 vol % or less,
a content of the conductive particles in the joint portion is 50 mass % or more and 70 mass % or less, and
the conductive particles include flaky metal particles and acicular conductive particles.

13. The electrolytic capacitor, according to claim 12, wherein
in the joint portion,
a mass ratio of the flaky metal particles to a total of the flaky metal particles and the acicular conductive particles is 60 mass % or more and 80 mass % or less.

14. The electrolytic capacitor, according to claim 12, wherein
in the joint portion,
a content of the flaky metal particles is 35 mass % or more and 45 mass % or less,
a content of the acicular conductive particles is 12 mass % or more and 22 mass % or less, and
a content of the resin cured product is 33 mass % or more and 45 mass % or less.

15. The electrolytic capacitor, according to claim 12, wherein
the flaky metal particles have
an aspect ratio of particle diameter to thickness of 20 or more on average, and
an average particle diameter of 1 μm or more and 30 μm or less.

16. The electrolytic capacitor, according to claim 12, wherein
the acicular conductive particles have
an aspect ratio of fiber length to fiber diameter of 10 or more on average,
an average fiber diameter of 0.1 μm or more and 2 μm or less, and
an average fiber length of 5 μm or more and 30 μm or less.

17. The electrolytic capacitor according to claim 12, wherein the flaky metal particles contain silver as a main component.

18. The electrolytic capacitor according to claim 12, wherein the acicular conductive particles have acicular ceramic particles and a metal film covering at least part of a surface of the ceramic particles.

19. The electrolytic capacitor according to claim 18, wherein the metal film contains silver as a main component.

20. The electrolytic capacitor according to claim 18, wherein the ceramic particles are of at least one kind selected from the group consisting of potassium titanate, graphite, aluminum oxide, silicon carbide, silicon nitride, magnesium sulfate, magnesium borate, zinc oxide, and titanium boride.

21. The electrolytic capacitor according to claim 12, having a package member sealing the capacitor element and allowing each of the anode lead terminal and the cathode lead terminal to be partially exposed.

* * * * *